UNITED STATES PATENT OFFICE.

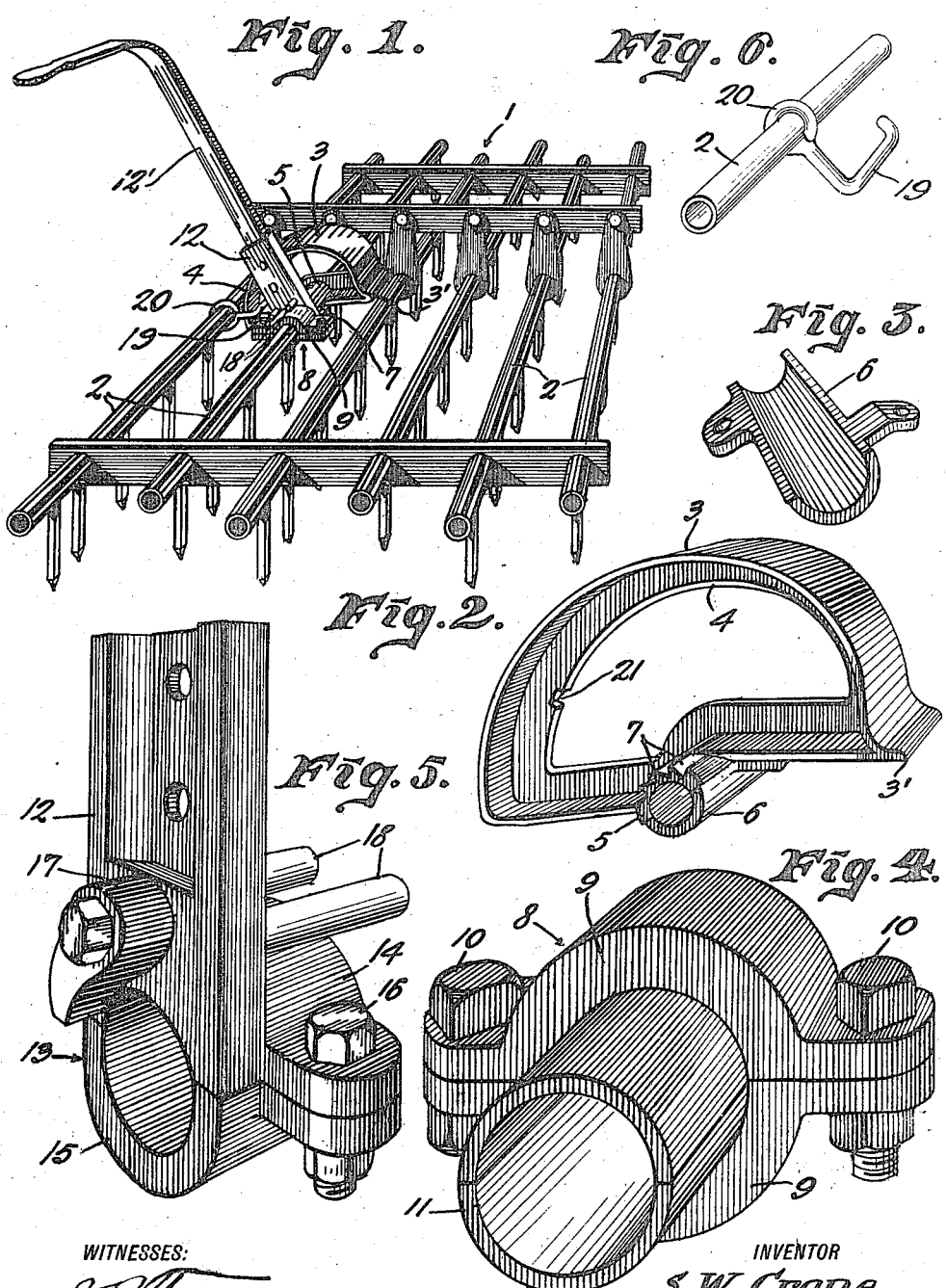

SAMUEL W. CRANE, OF LONE WOLF, OKLAHOMA.

DUMPING ATTACHMENT FOR HARROWS.

1,260,516.   Specification of Letters Patent.   Patented Mar. 26, 1918.

Application filed December 21, 1916. Serial No. 138,233.

*To all whom it may concern:*

Be it known that I, SAMUEL W. CRANE, a citizen of the United States, residing at Lone Wolf, in the county of Kiowa and State of Oklahoma, have invented a new and useful Dumping Attachment for Harrows, of which the following is a specification.

The present invention appertains generally to harrows, and aims to provide a novel and improved device for use upon various drag harrows, and operable for "dumping" the harrow when the teeth become clogged with accumulations of trash.

It is the object of the invention to provide a dumping device which can be readily attached to various harrows now in use without involving prohibitive trouble or expense, the device being comparatively simple and inexpensive in construction, and being practical and efficient in use.

Another object of the invention is the provision of a dumping device which after being started into operation manually, will complete its operation automatically, to raise the harrow from the ground, thereby enabling the harrow to pass off of the trash or accumulations, and eliminating the necessity of manually lifting the harrow or clearing the trash therefrom.

A still further object of the invention is to provide a dumping device which can be set in such a position as to form a runner or skid to assist in dragging the harrow about from one place to another, when the harrow teeth are swung rearwardly to an inoperative position.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

The invention is illustrated in the accompanying drawings, in which:—

Figure 1 is a perspective view of an ordinary harrow, illustrating the attachment applied.

Fig. 2 is a perspective view of the lifting cam forming the body of attachment.

Fig. 3 is a perspective view of the cap of the cam bearing.

Fig. 4 is a perspective view of the sleeve bearing.

Fig. 5 is a perspective view of the lever casting.

Fig. 6 is a perspective view of the cam-holding hook or catch.

The attachment is applicable to various harrows, a conventional type of harrow being illustrated in Fig. 1. This harrow, designated generally by the number 1, embodies a series of spaced transverse rock shafts 2 carrying the teeth, suitable means, which need not be considered in detail, being usually employed for rocking the shafts 2 to set the teeth at the desired angle.

The body or operating member of the attachment embodies a lifting cam 3 of substantially D-shape and provided with the internal flange or rib 4. The straight side of the cam is provided between its ends with a transverse bearing 5, one section of which is integral with the cam or casting 3, and the cap 6 of which is bolted or otherwise attached to the cam 3. The bearing 5 has a series of ratchet teeth 7 at one end, and the cam is provided at its forward corner with an outstanding lip 3', the rear end of the cam being heavier than the forward end whereby to swing the cam rearwardly so that its rear end tends to swing downwardly and trail on the ground. By removing the cap 6, the bearing 5 can be readily applied to any one of the rock shafts 2 at the desired point of the harrow, and a number of the attachments can be applied, if desired. The cap 6 is then attached to the cam, whereby to mount the cam for rotary movement upon the selected rock shaft 2.

A clamp collar 8 is applied to the same shaft 2 with the cam 3, and comprises sections 9 adapted to tightly embrace the shaft or beam 2, the sections 9 being connected by bolts 10 or equivalent securing elements whereby to make the collar 8 fast on the shaft. The collar 8 is provided at one side with a sleeve-shaped bearing 11 projecting toward the cam 3. The bearing 11 is split and its sections are carried by the sections 9 of the collar, whereby when the sections 9 are separated, they can be readily applied to the shaft 2 without separating the parts of the harrow, or loosening them. The bearing 11 supports a lever casting 12 for oscillatory movement, this casting having a sleeve 13 at one end, embodying the section 14 integral with the casting 12, and a cap 15 attached to the section 14 by means of bolts 16 or otherwise, it being evident that when the cap 15 is removed, the section 14 can be readily applied to the bearing 11 after which the cap 15 is applied and secured to the section 14, thereby mounting the casting 12 for oscillatory movement upon the bearing between the collar 8 and the cam 3. A pawl or dog 17 is pivoted in any suitable manner to the casting 12 and is engageable with the ratchet teeth 7 by a forward movement, the casting 12 projecting upwardly. A suitable lever 12' is secured to the casting 12 in any suitable manner, and is of suitable form or construction to be conveniently operated by the operator, whether he be riding the harrow or walking in rear. The casting 12 has a pair of outstanding stop pins 18 overhanging the collar 8 for limiting the oscillatory movement of the lever 12'.

As a means for holding the cam 3 in a position to provide a runner or skid, a hook or catch 19 has an eye 20 mounted loosely upon the shaft 2 in rear of that shaft carrying the cam 3, and the flange or rib 4 of the cam is provided with a notch 21 for engagement with the hook 19, whereby to hold the rear portion of the cam downwardly at an angle and the straight portion of the cam inclined, as seen in Fig. 1, so as to provide the runner or skid which can slide over the road, when moving the harrow from one place to another, with its teeth swung rearwardly and upwardly out of way.

Ordinarily, during the use of the harrow, the hook 19 is swung out of engagement with the notch 21 and is moved away from the cam so as not to interfere with the rotation thereof.

During the operation of the harrow, the cam 3 will drag in the position illustrated in Fig. 1, with the curved side uppermost, and the forward end and lip 3' above the ground. Whenever the teeth become clogged with accumulations of trash, the harrow can be readily dumped. This is accomplished by swinging the lever 12' rearwardly if it is not already in its rearmost position, thereby dragging the pawl 17 backwardly over the ratchet teeth 7, and then by swinging the lever forwardly, the pawl in engaging one of the ratchet teeth will turn the cam 3 forwardly, thereby depressing the lip 3' thereof. As soon as the lip 3' engages the ground or trash, the cam will roll over by its engagement with the ground or trash, completing the operation automatically. When the cam rolls over, it will raise the harrow off of the ground, thereby raising the teeth off of the trash, and the harrow being moved forwardly will be moved off of the trash, so as to clean the harrow. After the cam has rolled over, it is automatically returned to its normal position, as seen in Fig. 1, with the rear portion of the cam dragging or trailing upon the ground, ready for a new operation. It is thus only necessary to start the cam 3 forwardly into operation, whereby to move the center of gravity forwardly over the respective shaft 2.

Having thus described the invention, what is claimed as new is:—

1. A dumping device for harrows embodying a substantially D-shaped cam, the straight portion of which has a bearing for mounting the cam for rotary movement upon the harrow, and means for holding the cam with its straight portion inclined to serve as a runner.

2. A dumping device for harrows embodying a substantially D-shaped cam having an internal flange, the straight portion of the cam having a bearing for mounting it for rotation upon a harrow, and a catch adapted to be carried by the harrow and engageable with said flange for holding one end of the cam in a lowered position to serve as a runner.

3. A dumping device for harrows embodying a cam having a bearing adapted for rotation upon a harrow, said bearing having ratchet teeth, an oscillatory lever, means for mounting it adjacent to said cam and a pawl carried by the lever engageable with said ratchet teeth for removing one end of the cam from a trailing position and bringing the other end of the cam into engagement with the ground.

4. A dumping attachment for harrows embodying a cam having a bearing, said bearing having a detachable cap, a clamp comprising sections applicable to a member of a harrow, said clamp having a bearing, a lever member having a sleeve adapted to be journaled on the second mentioned bearing, said sleeve having a detachable cap, and coöperable means carried by the cam and lever member for partially rotating the cam when the lever member is swung.

5. A dumping attachment for harrows embodying a substantially D-shaped cam, the straight portion of which has a bearing, said bearing having a removable cap and ratchet teeth, a sectional clamp applicable to a member of the harrow and having a bearing projecting toward the cam, a lever member having a sleeve adapted to be journaled on the second mentioned bearing, said sleeve having a detachable cap, and a pawl carried by the lever member engageable with said ratchet teeth.

In testimony that I claim the foregoing as my own, I have hereto affixed my signature in the presence of two witnesses.

SAMUEL W. CRANE.

Witnesses:
 Ivy E. Simpson,
 Monroe E. Miller.

Copies of this patent may be obtained for five cents each, by addressing the "Commissioner of Patents, Washington, D. C."